United States Patent [19]

Hajimichael et al.

[11] 4,383,099

[45] May 10, 1983

[54] ENCAPSULANT MATERIAL SUITABLE FOR USE UNDER CONDITIONS OF PROLONGED VACUUM

[75] Inventors: Agathangelos Hajimichael, Wembley; Sidney Hopper, Lightwater; Peter K. Smith, Ashford, all of England

[73] Assignee: E M I Limited, Hayes, England

[21] Appl. No.: 287,150

[22] Filed: Jul. 27, 1981

[51] Int. Cl.$^3$ ............... C08G 18/48; C08G 18/75; C08G 18/76

[52] U.S. Cl. ................... 528/60; 264/271.1; 264/279; 528/65

[58] Field of Search ................... 528/60, 65

[56] References Cited

U.S. PATENT DOCUMENTS

| | | | |
|---|---|---|---|
| 3,033,825 | 5/1962 | Murphy | 528/60 |
| 3,897,401 | 7/1975 | Ringler et al. | 528/65 |
| 4,190,711 | 2/1980 | Zdrahala et al. | 521/112 |
| 4,202,956 | 5/1980 | Taylor | 528/75 |
| 4,243,760 | 1/1981 | McDaniel et al. | 521/176 |

OTHER PUBLICATIONS

European Space Agency-Specification ESA PSS-09/QRM-02T (ESTEC) Issue No. 2, Jan. 8, 1976.

*Primary Examiner*—H. S. Cockeram
*Attorney, Agent, or Firm*—Fleit, Jacobson & Cohn

[57] ABSTRACT

An encapsulant material suitable for use in space applications a polyurethane having according to the ESTEC specification a total mass loss of not greater than 1% and condensible volatiles content of not greater than 0.1% combined with a vibration performance characterised by a Q of from 4 to 15 and a peak frequency of 200 to 400 Hz when vibrated at 1g.

15 Claims, No Drawings

ENCAPSULANT MATERIAL SUITABLE FOR USE UNDER CONDITIONS OF PROLONGED VACUUM

This invention relates to an encapsulant material and, in particular, to such a material which is suitable for use in conditions of prolonged vacuum such as, for example, the environment encountered outside the earth's atmosphere. For such space applications it is a requirement of an encapsulant material that it should have a low outgassing characteristic and it is also necessary for it to possess suitable vibration damping characteristics to protect the encapsulated items which may comprise scientific instrumentation from the stresses of launching. Good dimensional stability over the range of temperatures encountered in space is also highly desirable.

It is an object of the present invention to provide such a material.

The outgassing characteristic of such materials may be defined by what is referred to hereinafter as the European Space Research and Technology Centre (ESTEC) specification which relates to mass loss after exposure to vacuum conditions ($10^{-6}$ to $10^{-7}$ torr) for 24 hours at 125° C. and to the percentage of condensible volatile material deposited under such conditions (see European Space Research Organisation (E.S.R.O.)) Specification PSS 09/QRM-02T). Other tests which may be carried out on such material include (a) a vibration test on two concentric mild steel cylinders of length 45 mm. and diameters of 12 mm and 25 mm. The small cylinder is vibrated sinusoidally at a r.m.s. acceleration of 1 g.

(b) Volume resistivity of a 3-4 mm. sample of the material measured between circular brass electrodes of 50 mm. diameter under a constant d.c. voltage of 500 volts. Accordingly we provide as an encapsulant material suitable for use in space applications a polyurethane having according to the ESTEC specification a total mass loss of not greater than 1% and condensible volatiles content of not greater than 0.1% combined with a vibration performance characterised by a Q of from 4 to 15 and a peak frequency of 200 to 400 Hz when vibrated at 1 g.

A suitable polyurethane for this application is that formed by the reaction of a polyether polyol having high molecular weight segments between functional hydroxyl groups and a molar excess of a diisocyanate to give a prepolymer preferably containing from 3.5% to 5.0% of free isocyanate groups which is then reacted with an equivalent amount of a low molecular weight polyol. Particularly suitable polyether polyols include certain polyoxypropylene glycols of molecular weight between 3500 and 5000 having a chemical structure such that the ratio of molecular weight to hydroxyl number is at least 90. The low molecular weight polyol, which in practice acts as a cross linking agent for the prepolymer may conveniently be a triol or a diol having a molecular weight of from 90 to 190 (i.e. $C_4$ to $C_{10}$). We have found that 1, 2, 6-hexanetriol is particularly suitable, but other materials which are liquid or are low melting point (less than 60° C.) solids e.g. trimethylol propane or 1,6-hexanediol may successfully be used.

The diisocyanate may be toluene diisocyanate or isophorone diisocyanate, but the latter is preferred on account of its reduced toxicity and thus increased ease of handling as compared with the former.

The initial reaction to prepare the prepolymer may be carried out without a catalyst at a temperature of 80° to 100° C. during the initial mixing of the reactants which is allowed to rise to 110° to 130° C. during the subsequent reaction. Reaction of the prepolymer with the low molecular weight polyol is normally catalysed for example by a catalyst such as dibutyltindilaurate and may be carried out at any suitable temperature between 40° C. and 100° C. This final reaction may be carried out in situ, i.e., whilst in contact with the object or apparatus to be encapsulated and, for this reason, particularly where delicate scientific instruments are concerned, it is preferred to carry out the reaction at a relatively low temperature i.e. in the region of 40° C. At this temperature the reaction is normally complete in about 24 hours.

It is preferred not to include any unnecessary additives such as plasticisers in the final product in order to meet the outgassing specifications but, if desired, a pigment or non-volatile dyestuff may be incorporated, for example, where a black colour is required, from 0.03 to 0.06% of nubian black may be incorporated in the reaction mixture.

We have found that the polyurethane encapsulant materials according to our invention possess a glass transition temperature of from −70° to −35° C., preferably from −60° to −50° C. They also possess a low coefficient of expansion over the whole range of ambient temperatures to which they are likely to be exposed in space applications ie. from −30° C. to 50° C. Specifically, the coefficient of expansion should be within the range of 50 to 250 p.p.m./°C. over this range of temperature. The materials normally have a hardness within the range of 40 to 70, preferably 50 to 60 International Rubber Hardness Degrees (IRHD).

It is further desirable that the polyurethane encapsulant materials have a volume resistivity such that while providing adequate insulation for the voltages which may be present in the encapsulated apparatus, no excessive static charge can be accumulated. Specifically, the volume resistivity is from $5.10^9$ to $10^{11}$ ohm meters, preferably from $2.10^{10}$ to $7.10^{10}$ ohm meters.

The preferred materials have a vibration performance characterised by a Q of from 5.6 to 12.0 and a peak frequency of from 240 to 350 Hz when vibrated at 1 g.

The materials of the present invention may be used for the encapsulation of scientific instrumentation for use in a space telescope project.

A further useful property of the polyurethane materials of the present invention is that they are easily joined to other materials by suitable adhesive such as an epoxy resin.

The invention will now be illustrated by the following Examples. It will be understood that the invention is in no way limited to the particular embodiments described therein.

EXAMPLE 1

A polyoxypropylene glycol of molecular weight 5300 and hydroxyl number 32 (molecular weight/hydroxyl number=166) was used as the starting material in the following reactions. For convenience this starting material will be referred to as T32/75, this being the code number under which it is commercially available (from I.C.I. Limited).

(a) To isophorone diisocyanate (750 g.), heated in an inert atmosphere to 90° C., was added T32/75 (4000 g.) at a rate of 60-100 g. per minute. During the addition the reactants were constantly stirred and the mix was maintained at a temperature of from 90° C. to 100° C. On completion of the addition, the temperature was raised to 130° C. for a further 8 to 12 hours. The resultant prepolymer had a free isocyanate content of 3.6%.

(b) The prepolymer (100 g.) was degassed below 0.1 torr. for 20 minutes and dibutyltindilaurate (0.05 g.) added, followed by 1,2,6-hexanetriol (3.6 g.). These constituents were thoroughly mixed at room temperature, the mix degassed below 0.1 torr. for 10 minutes and then heated at 40° C. for 16 hours in an air-circulating oven.

The product had according to the above-mentioned ESTEC specification a total mass loss of 1% and a condensible volatiles content of 0.1%. Its vibration performance was characterised by a Q of from 5.6 to 12.0 and a peak frequency of from 240 to 350 Hz when vibrated at 1 g. In addition the material had a volume resistivity of from $2.10^{10}$ to $7.10^{10}$ ohm meters. Its glass transition temperature was −54° C., and the coefficient of expansion over the range −30° C. to 50° C. was between 54 and 182 p.p.m/°C.

EXAMPLE 2

When the procedure of Example 1(b) is repeated, using in place of 1,2,6-hexanetriol the following low molecular weight polyols:

(a) 1,4-butanediol (b) a 1:1 mixture of butanediol and trimethylolpropane a similar material to that produced in Example 1(b) is obtained, having a Q of 4.1 and a peak frequency of 250 Hz and a volume resistivity of $6.10^9$ ohm meters.

EXAMPLE 3

The prepolymer (100 g.) of Example 1(a) was degassed below 0.1 torr. for 20 minutes and warmed to 60° C. Dibutyltindilaurate (0.01 g.) was added followed by trimethylolpropane (3.6 g.) at 100° C. After thorough mixing and degassing below 0.1 torr. for 10 minutes, the temperature of the reactants was maintained at 60° C. for 16 hours to yield a product similar to that produced in Example 1(b). This product had a Q of 5.9 and a peak frequency of 300 Hz and a volume resistivity of $10^{10}$ ohm meters.

What we claim is:

1. An encapsulant material suitable for use in space applications which comprises a polyurethane formed from the reaction of a polyoxypropylene glycol of molecular weight between 3500 and 5000 and a chemical structure such that the ratio of molecular weight to hydroxyl number is at least 90 with a molar excess of a diisocyanate selected from the group consisting of toluene diisocyanate and isophorone diisocyanate under conditions that will give a prepolymer containing from 3.5% to 5.0% of free isocyanate groups, with an equivalent amount of a triol or diol having a molecular weight of from 90 to 190, said polyurethane when cured having according to the European Space Research and Technology Centre (ESTEC) specification a total mass loss not greater than 1% and condensible volatiles content of not greater than 0.1% combined with a vibration performance characterised by a Q of from 4 to 15 and a peak frequency of 200 to 400 Hz when vibrated at 1 g.

2. A material according to claim 1 with a vibration performance characterised by a Q of from 5.6 to 12 and a peak frequency of from 240 to 350 Hz when vibrated at 1 g.

3. A material according to claim 1 which possesses a glass transition temperature of from −70° to −35° C.

4. A material according to claim 3 which possesses a glass transition temperature of from −60° to −50° C.

5. A material according to claim 1 which possesses a coefficient of expansion of from 50 to 250 p.p.m./°C. over a range of temperature of from −30° to −50° C.

6. A material according to claim 1 which has a hardness of from 40 to 70 International Rubber Hardness Degrees.

7. A material according to claim 6 which has a hardness of from 50 to 60 International Rubber Hardness Degrees.

8. A material according to claim 1 which has a volume resistivity of from $5.10^9$ to $10^{11}$ ohm meters.

9. A material according to claim 8 which has a volume resistivity of from $2.10^{10}$ to $7.10^{10}$ ohm meters.

10. A process for the preparation of a polyurethane encapsulant material suitable for use in space applications which process comprises reacting a polyoxypropylene glycol of molecular weight between 3500 and 5000 and a chemical structure such that the ratio of molecular weight to hydroxyl number is at least 90 with a molar excess of a diisocyanate selected from the group consisting of toluene diisocyanate and isophorone diisocyanate under conditions that will give a prepolymer containing from 3.5% to 5.0% of free isocyanate groups and then reacting said prepolymer with an equivalent amount of a triol or diol having a molecular weight of from 90 to 190, and thereafter curing the resultant reaction product.

11. A process according to claim 10 wherein said diisocyanate is isophorone diisocyanate.

12. A process according to claim 10 wherein said prepolymer is reacted with 1, 2, 6-hexanetriol.

13. A process according to claim 10 wherein said prepolymer is reacted with said triol or diol in the presence of a catalyst.

14. A process according to claim 13 wherein said catalyst is dibutyltin dilaurate.

15. A method of encapsulating an object or apparatus in a polyurethane material which material has a total mass loss of not greater than 1% and a condensible volatiles content of not greater than 0.1% combined with a vibration performance characterised by a Q of from 4 to 15 and a peak frequency of 200 to 400 Hz when vibrated at 1 g which method comprises reacting in situ while in contact with said object or apparatus to be encapsulated a prepolymer, formed from the reaction of a polyoxypropylene glycol of molecular weight between 3500 and 5000 and a chemical structure such that the ratio of molecular weight to hydroxyl number is at least 90 with a molar excess of a diisocyanate selected from the group consisting of toluene diisocyanate and isophorone diisocyanate under conditions that will give a prepolymer containing from 3.5% to 5.0% of free isocyanate groups, with an equivalent amount of a triol or diol having a molecular weight of from 90 to 190, and thereafter curing the resultant reaction product.

* * * * *